United States Patent
Turek et al.

(10) Patent No.: US 9,234,109 B2
(45) Date of Patent: Jan. 12, 2016

(54) PHASE CHANGE INKS

(75) Inventors: Caroline M Turek, Mississauga (CA);
Marcel P Breton, Mississauga (CA)

(73) Assignee: Xerox Corporation, Norwalk, CT (US)

(*) Notice: Subject to any disclaimer, the term of this patent is extended or adjusted under 35 U.S.C. 154(b) by 1208 days.

(21) Appl. No.: 12/241,791

(22) Filed: Sep. 30, 2008

(65) Prior Publication Data

US 2010/0080922 A1 Apr. 1, 2010

(51) Int. Cl.
*B05D 1/04* (2006.01)
*B05D 5/00* (2006.01)
*C09D 11/02* (2014.01)
*C09D 175/04* (2006.01)
*C09D 11/328* (2014.01)
(Continued)

(52) U.S. Cl.
CPC .............. *C09D 11/328* (2013.01); *C09D 11/34* (2013.01); *C09D 11/38* (2013.01)

(58) Field of Classification Search
USPC ........................ 106/31.29–31.31, 31.61–31.63
See application file for complete search history.

(56) References Cited

U.S. PATENT DOCUMENTS 3,653,932 A 4/1972 Berry et al.
4,390,369 A 6/1983 Merritt et al.
(Continued)

FOREIGN PATENT DOCUMENTS

EP 0187352 7/1986
EP 0206286 12/1986
(Continued)

OTHER PUBLICATIONS

Cardolite (Brochure, edition Jun. 2004, p. 8, http://www.anacardium.info/IMG/pdf/brochure_Cardolite_complete_juni_2004.pdf, accessed Jan. 12, 2015).*
(Continued)

*Primary Examiner* — Rachel Kahn

(57) ABSTRACT

Phase change ink comprising colorant and carrier comprising additive of formula

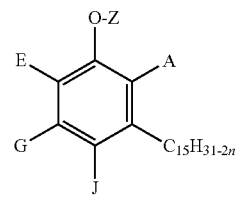

wherein A, E, G, and J are —H, —Cl, —Br, —I, —OH, —COOH, amino, alkyl, aryl, arylalkyl, alkylaryl; Z is —H, alkyl, aryl, arylalkyl, alkylaryl, —(CH$_2$CH$_2$O)$_m$H,

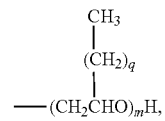

Na, K, —P(X)(OR$_5$)(OR$_6$) wherein X is oxygen or sulfur, or —C(=O)R$_7$, and n is 0, 1, 2, or 3. Also, a process which comprises (1) incorporating into an ink jet printing apparatus a phase change ink as disclosed herein; (2) melting the ink; and (3) causing droplets of the melted ink to be ejected in an imagewise pattern onto a substrate.

21 Claims, 1 Drawing Sheet

(51) Int. Cl.
*C09D 11/34* (2014.01)
*C09D 11/38* (2014.01)

(56) References Cited

U.S. PATENT DOCUMENTS

| | | | |
|---|---|---|---|
| 4,484,948 A | | 11/1984 | Merritt et al. |
| 4,684,956 A | | 8/1987 | Ball |
| 4,851,045 A | | 7/1989 | Taniguchi |
| 4,889,560 A | | 12/1989 | Jaeger et al. |
| 4,889,761 A | | 12/1989 | Titterington et al. |
| 5,006,170 A | | 4/1991 | Schwarz et al. |
| 5,151,120 A | | 9/1992 | You et al. |
| 5,372,852 A | | 12/1994 | Titterington et al. |
| 5,496,879 A | | 3/1996 | Griebel et al. |
| 5,621,022 A | | 4/1997 | Jaeger et al. |
| 6,229,054 B1 * | 5/2001 | Dai et al. | 568/630 |
| 6,306,203 B1 * | 10/2001 | Malhotra et al. | 106/31.29 |
| 6,309,453 B1 * | 10/2001 | Banning et al. | 106/31.29 |
| 6,350,305 B1 * | 2/2002 | King et al. | 106/31.29 |
| 6,350,795 B1 * | 2/2002 | Breton et al. | 523/160 |
| 6,768,029 B1 | | 7/2004 | Khan et al. |
| 6,860,930 B2 * | 3/2005 | Wu et al. | 106/31.29 |
| 2003/0172841 A1 * | 9/2003 | Titterington et al. | 106/31.29 |
| 2004/0261656 A1 * | 12/2004 | Wu et al. | 106/31.29 |
| 2006/0004123 A1 | | 1/2006 | Wu et al. |
| 2006/0117992 A1 * | 6/2006 | Goredema et al. | 106/31.43 |
| 2007/0119338 A1 * | 5/2007 | Breton et al. | 106/31.29 |
| 2009/0068126 A1 * | 3/2009 | Soares Romeiro et al. | 424/59 |

FOREIGN PATENT DOCUMENTS

| | | |
|---|---|---|
| EP | 1335006 | 8/2003 |
| EP | 1335006 A | 8/2003 |
| EP | 1364955 | 11/2003 |
| EP | 1364955 A | 11/2003 |
| EP | 1131277 B1 | 7/2005 |
| EP | 1666548 | 6/2006 |
| EP | 1666548 A | 6/2006 |
| EP | 2100926 | 9/2009 |
| EP | 2100926 A | 9/2009 |
| JP | 95081137 B2 * | 8/1995 |
| WO | WO 94/04619 | 3/1994 |
| WO | WO 00/31015 | 6/2000 |

OTHER PUBLICATIONS

Abstract for German Patent Publication DE 4205636AL.
Abstract for German Patent Publication DE 4205713AL.
Jinu Suju Mathew, "Novel Thermally Stable Polymers from a Renewable Resource (Cashew Nut Shell Liquid): Thesis, Characterization, and Applications," Ph.D. Thesis, U. of Pune, Jul. 2001, chap. 2.
Francisco Helder A. Rodrigues et al., "Antioxidant Activity of Cashew Nut Shell Liquid (CNSL) Derivatives on the Thermal Oxidation of Synthetic cis-1,4-Polyisoprene," *J. Braz. Chem. Soc.*, Vo. 17, No. 2, 265-271, 2006.
T.N. Castro Dantas et al., "Novel antioxidants from cashew nut shell liquid applied to gasoline stabilization," *Fuel*, 82 1465-1469 (2003).
David Wasserman et al., "Cashew Nut Shell Liquid. III. The Cardol Component of Indian Cashew Nut Shell Liquid with Reference to the Liquid's Vesicant Activity", vol. 70, Nov. 1948.
J. R. Swain et al., "Polymer from Renewable Resources: Studies on Synthesis Characterization, and Thermal Properties of Resins Derived from Diazotized Cardanol-Formaldehyde-Organic Compounds", Polym.-Plast. Technol. Engl., 39(5), 927-936 (2000).
Mary C. Lub et al., "Cashew Nut Shell Liquid (CNSL)—a versatile monomer for polymer synthesis", Designed Monomers and Polymers, vol. 3, No. 2, pp. 123-153 (2000).
European Search Report, Application No. 09169888.6-2102, dated Jan. 19, 2010, 4 pages.
Tajber and Tadeusz, "Method of Obtaining a Lubricant Additive," Chemical Abstracts, American Chemical Society, US, vol. 18, No. 114, May 6, 1991, 1 page.

* cited by examiner

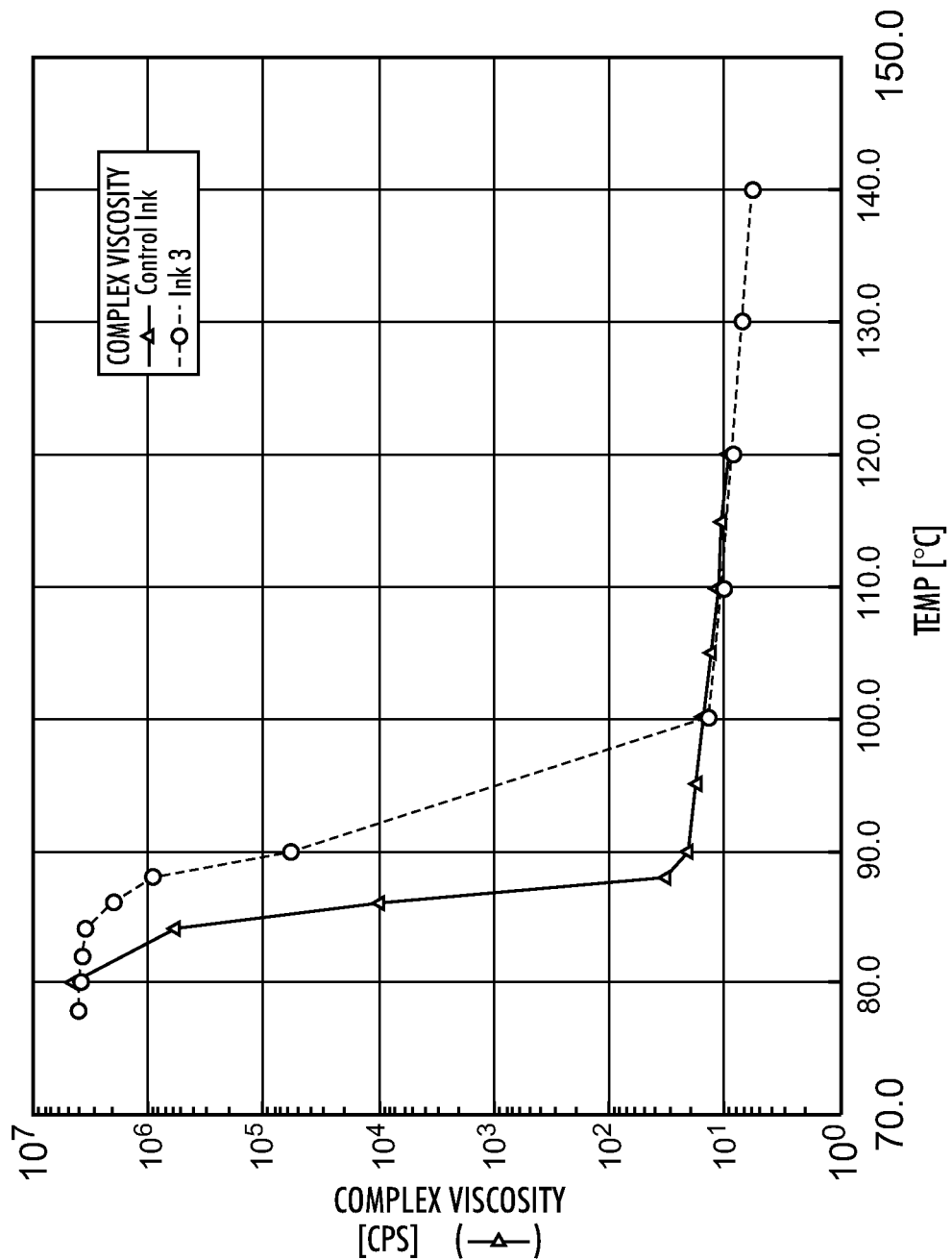

PHASE CHANGE INKS

BACKGROUND

Disclosed herein are hot melt or phase change inks and methods for the use thereof. More specifically, disclosed herein are hot melt or phase change inks particularly suitable for use in phase change ink jet printing processes and containing ingredients from renewable resources. One embodiment is directed to a phase change ink comprising (1) a colorant and (2) an ink carrier comprising an additive of the formula

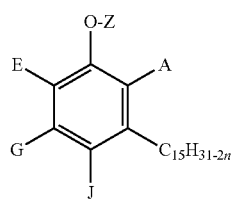

wherein A, E, G, and J each, independently of the others, are (i) —H, (ii) —Cl, —Br, or —I, (iii) —OH, (iv) —COOH, (v) —NR$_3$R$_4$ wherein R$_3$ and R$_4$ each, independently of the others, are (a) —H, (b) alkyl groups, including linear, branched, saturated, unsaturated, cyclic, substituted, and unsubstituted alkyl groups, and wherein hetero atoms either may or may not be present in the alkyl group, (c) aryl groups, including substituted and unsubstituted aryl groups, and wherein hetero atoms either may or may not be present in the aryl group, (d) arylalkyl groups, including substituted and unsubstituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (e) alkylaryl groups, including substituted and unsubstituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, (vi) alkyl groups, including linear, branched, saturated, unsaturated, cyclic, substituted, and unsubstituted alkyl groups, and wherein hetero atoms either may or may not be present in the alkyl group, (vii) aryl groups, including substituted and unsubstituted aryl groups, and wherein hetero atoms either may or may not be present in the aryl group, (viii) arylalkyl groups, including substituted and unsubstituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (ix) alkylaryl groups, including substituted and unsubstituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, Z is (i) —H, (ii) an alkyl group, including linear, branched, saturated, unsaturated, cyclic, substituted, and unsubstituted alkyl groups, and wherein hetero atoms either may or may not be present in the alkyl group, (iii) an aryl group, including substituted and unsubstituted aryl groups, and wherein hetero atoms either may or may not be present in the aryl group, (iv) an arylalkyl group, including substituted and unsubstituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, (v) an alkylaryl group, including substituted and unsubstituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, (vi) —(CH$_2$CH$_2$O)$_m$H or

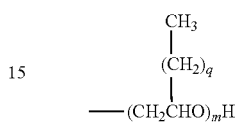

wherein m is an integer of from 1 to about 8 and q is an integer of from 0 to about 5, (vii) Na or K, (viii) —P(X)(OR$_5$)(OR$_6$) wherein X is an oxygen atom or a sulfur atom and R$_5$ and R$_6$ each, independently of the other, are (a) alkyl groups, including linear, branched, saturated, unsaturated, cyclic, substituted, and unsubstituted alkyl groups, and wherein hetero atoms either may or may not be present in the alkyl group, (b) aryl groups, including substituted and unsubstituted aryl groups, and wherein hetero atoms either may or may not be present in the aryl group, (c) arylalkyl groups, including substituted and unsubstituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (d) alkylaryl groups, including substituted and unsubstituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, or (ix) —C(=O)R$_7$ wherein R$_7$ is (a) an alkyl group, including linear, branched, saturated, unsaturated, cyclic, substituted, and unsubstituted alkyl groups, and wherein hetero atoms either may or may not be present in the alkyl group, (b) an aryl group, including substituted and unsubstituted aryl groups, and wherein hetero atoms either may or may not be present in the aryl group, (c) an arylalkyl group, including substituted and unsubstituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (d) an alkylaryl group, including substituted and unsubstituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, and n is an integer of 0, 1, 2, or 3. Also disclosed herein is a process which comprises (1) incorporating into an ink jet printing apparatus a phase change ink as disclosed herein; (2) melting the ink; and (3) causing droplets of the melted ink to be ejected in an imagewise pattern onto a substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

While known inks are suitable for their intended purposes, a need remains for improved phase change inks. In addition, a need remains for phase change inks containing at least some ingredients derived from renewable sources. Further, a need remains for phase change inks with enhanced thermal stability. Additionally, a need remains for phase change inks with reduced costs.

SUMMARY

Disclosed herein is a phase change ink comprising (1) a colorant and (2) an ink carrier comprising an additive of the formula

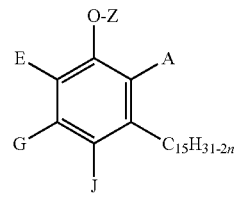

wherein A, E, G, and J each, independently of the others, are (i) —H, (ii) —Cl, —Br, or —I, (iii) —OH, (iv) —COOH, (v) —NR$_3$R$_4$ wherein R$_3$ and R$_4$ each, independently of the others, are (a) —H, (b) alkyl groups, including linear, branched, saturated, unsaturated, cyclic, substituted, and unsubstituted alkyl groups, and wherein hetero atoms either may or may not be present in the alkyl group, (c) aryl groups, including substituted and unsubstituted aryl groups, and wherein hetero atoms either may or may not be present in the aryl group, (d) arylalkyl groups, including substituted and unsubstituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (e) alkylaryl groups, including substituted and unsubstituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, (vi) alkyl groups, including linear, branched, saturated, unsaturated, cyclic, substituted, and unsubstituted alkyl groups, and wherein hetero atoms either may or may not be present in the alkyl group, (vii) aryl groups, including substituted and unsubstituted aryl groups, and wherein hetero atoms either may or may not be present in the aryl group, (viii) arylalkyl groups, including substituted and unsubstituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (ix) alkylaryl groups, including substituted and unsubstituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, Z is (i) —H, (ii) an alkyl group, including linear, branched, saturated, unsaturated, cyclic, substituted, and unsubstituted alkyl groups, and wherein hetero atoms either may or may not be present in the alkyl group, (iii) an aryl group, including substituted and unsubstituted aryl groups, and wherein hetero atoms either may or may not be present in the aryl group, (iv) an arylalkyl group, including substituted and unsubstituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, (v) an alkylaryl group, including substituted and unsubstituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, (vi) —(CH$_2$CH$_2$O)$_m$H or

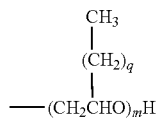

wherein m is an integer of from 1 to about 8 and q is an integer of from 0 to about 5, (vii) Na or K, (viii) —P(X)(OR$_5$)(OR$_6$) wherein X is an oxygen atom or a sulfur atom and R$_5$ and R$_6$ each, independently of the other, are (a) alkyl groups, including linear, branched, saturated, unsaturated, cyclic, substituted, and unsubstituted alkyl groups, and wherein hetero atoms either may or may not be present in the alkyl group, (b) aryl groups, including substituted and unsubstituted aryl groups, and wherein hetero atoms either may or may not be present in the aryl group, (c) arylalkyl groups, including substituted and unsubstituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (d) alkylaryl groups, including substituted and unsubstituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, or (ix) —C(=O)R$_7$ wherein R$_7$ is (a) an alkyl group, including linear, branched, saturated, unsaturated, cyclic, substituted, and unsubstituted alkyl groups, and wherein hetero atoms either may or may not be present in the alkyl group, (b) an aryl group, including substituted and unsubstituted aryl groups, and wherein hetero atoms either may or may not be present in the aryl group, (c) an arylalkyl group, including substituted and unsubstituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (d) an alkylaryl group, including substituted and unsubstituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, and n is an integer of 0, 1, 2, or 3. Also disclosed herein is a process which comprises (1) incorporating into an ink jet printing apparatus a phase change ink as disclosed herein; (2) melting the ink; and (3) causing droplets of the melted ink to be ejected in an imagewise pattern onto a substrate.

BRIEF DESCRIPTION OF THE DRAWING

The FIGURE depicts a graph showing the rheology of the control ink and ink 3 prepared in Example 1.

DETAILED DESCRIPTION

The cashew nutshell liquid (CNSL)-derived additives contained in the inks disclosed herein are of the formula

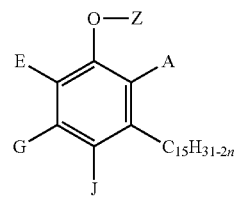

wherein A, E, G, and J each, independently of the others, are (i) —H, (ii) —Cl, —Br, or —I, (iii) —OH, (iv) —COOH, (v) —NR$_3$R$_4$ wherein R$_3$ and R$_4$ each, independently of the others, are (a) —H, (b) alkyl groups (including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 2 carbon atoms, in yet another embodiment with at least about 3 carbon atoms, in still another embodiment with at least about 4 carbon atoms, in another embodiment with at least about 5 carbon atoms, in yet another embodiment with at least about 6 carbon atoms, in still another embodiment with at least about 7 carbon atoms, in another embodiment with at least about 8 carbon atoms, in yet another embodiment with at least about 9 carbon atoms, and in still another embodiment with at least about 10 carbon atoms, and in one embodiment with no more than about 15 carbon atoms, and in another embodiment with no more than about 10 carbon atoms, although the number of carbon atoms can be outside of these ranges, (c) aryl groups (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in one embodiment with no more than about 12 carbon atoms, and in specific embodiments 5, 6, 10, or 12 carbon atoms, although the number of carbon atoms can be outside of these ranges, (d) arylalkyl groups (including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as benzyl and the like, or (e) alkylaryl groups (including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as tolyl and the like, (vi) alkyl groups (including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 2 carbon atoms, in yet another embodiment with at least about 3 carbon atoms, in still another embodiment with at least about 4 carbon atoms, in another embodiment with at least about 5 carbon atoms, in yet another embodiment with at least about 6 carbon atoms, in still another embodiment with at least about 7 carbon atoms, in another embodiment with at least about 8 carbon atoms, in yet another embodiment with at least about 9 carbon atoms, and in still another embodiment with at least about 10 carbon atoms, and in one embodiment with no more than about 15 carbon atoms, and in another embodiment with no more than about 10 carbon atoms, although the number of carbon atoms can be outside of these ranges, (vii) aryl groups (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in one embodiment with no more than about 12 carbon atoms, and in specific embodiments 5, 6, 10, or 12 carbon atoms, although the number of carbon atoms can be outside of these ranges, (viii) arylalkyl groups (including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as benzyl and the like, or (ix) alkylaryl groups (including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as tolyl and the like, wherein the substituents on the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, Z is (i) —H, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 15 carbon atoms, and in another embodiment with no more than about 10 carbon atoms, although the number of carbon atoms can be outside of these ranges, and in specific embodiments 1, 2, 3, 4, 5, 6, 7, 8, 9, or 10 carbon atoms, (iii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in one embodiment with no more than about 12 carbon atoms, and in specific embodiments 5, 6, 10, or 12 carbon atoms, although the number of carbon atoms can be outside of these ranges, (iv) an arylalkyl group (including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as benzyl and the like, (v) an alkylaryl group (including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as tolyl and the like, wherein the substituents on the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, (vi) —(CH$_2$CH$_2$O)$_m$H or

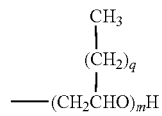

wherein m is an integer of from 1 to about 8 and q is an integer of from 0 to about 5, (vii) Na or K, (viii) —P(X)(OR$_5$)(OR$_6$) wherein X is an oxygen atom or a sulfur atom and R$_5$ and R$_6$ each, independently of the other, are (a) alkyl groups (including linear, branched, saturated, unsaturated, cyclic, substituted, and unsubstituted alkyl groups, and wherein hetero atoms, such as oxygen, nitrogen, sulfur, silicon, phosphorus, boron, and the like, either may or may not be present in the alkyl group), in one embodiment with at least 1 carbon atom, and in one embodiment with no more than about 25 carbon atoms, although the number of carbon atoms can be outside of these ranges, (b) aryl groups (including substituted and unsubstituted aryl groups, and wherein hetero atoms, such as oxygen, nitrogen, sulfur, silicon, phosphorus, boron, and the like, either may or may not be present in the aryl group), in one embodiment with at least about 5 carbon atoms, and in one embodiment with no more than about 12 carbon atoms, and in specific embodiments 5, 6, 10, or 12 carbon atoms, although the number of carbon atoms can be outside of these ranges, (c) arylalkyl groups (including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as benzyl and the like, or (d) alkylaryl groups (including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as tolyl and the like, wherein the substituents on the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, or (ix) —C(=O)R$_7$ wherein R$_7$ is (a) an alkyl group (including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 15 carbon atoms, and in another embodiment with no more than about 10 carbon atoms, although the number of carbon atoms can be outside of these ranges, and in specific embodiments 1, 2, 3, 4, 5, 6, 7, 8, 9, or 10 carbon atoms, (b) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in one embodiment with no more than about 12 carbon atoms, and in specific embodiments 5, 6, 10, or 12 carbon atoms, although the number of carbon atoms can be outside of these ranges, (c) an arylalkyl group (including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as benzyl and the like, or (d) an alkylaryl group (including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as tolyl and the like, wherein the substituents on the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, and n is an integer of 0, 1, 2, or 3. In one specific embodiment, A is —H or —COOH. In one specific embodiment, A is —H or —CH$_2$OH. In one specific embodiment, E is —H or —CH$_2$OH. In one specific embodiment, G is —H or —OH. In one specific embodiment, J is —H, —CH$_2$OH, or —NH$_2$. In one specific embodiment, when n is 1, the double bond is located in the 8 position, as follows:

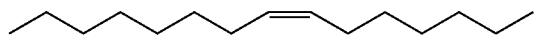

In one specific embodiment, when n is 2, the double bonds are located in the 8 and 11 positions, as follows:

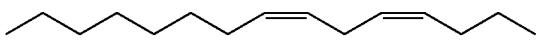

In one specific embodiment, when n is 3, the double bonds are located in the 8, 11, and 14 positions, as follows:

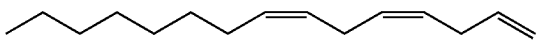

When these materials are obtained commercially, n is often a mixture; for example, CARDANOL®, is believed to be a material of the above formula wherein Z is H and A, E, G, and J are all H, commercially available from Cardolite Corporation, Newark, N.J., generally reported as a material wherein n is 2, it is believed that a distribution of compounds is present wherein 3% of the material has n=0, 34 to 36% of the material has n=1, 21 to 22% of the material has n=2, and 40 to 41% of the material has n=3. CARDOLITE® NC-510, also available from Cardolite Corporation, is believed to be a material of the formula

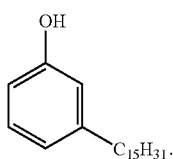

CARDOLITE® LITE 2020, also available from Cardolite Corporation, is believed to be a material of the formula

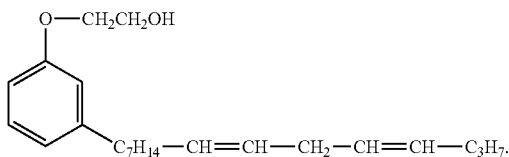

The hydrogenated form, wherein n=0, can be obtained by catalytic reduction of the unsaturated compounds in the presence of a palladium or platinum or nickel hydrogenation catalyst as described, for example, in Example 1 of U.S. Pat. No. 6,660,696, the disclosure of which is totally incorporated herein by reference.

Other examples of suitable materials include the saturated form of CARDOLITE® LITE 2020, of the formula

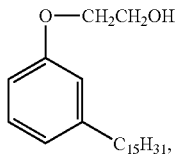

4-(3-pentadecylphenoxy)benzene-1,3-diamine, of the formula

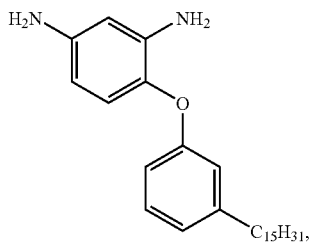

3-pentadecylphenyl-3,5-diaminobenzoate, of the formula

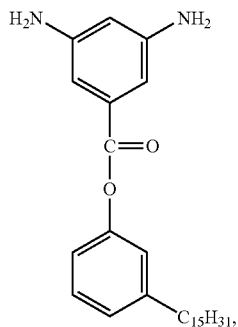

and 3,5-diamino-N-(4-(3-pentadecylphenoxy)phenyl)benzamide, of the formula

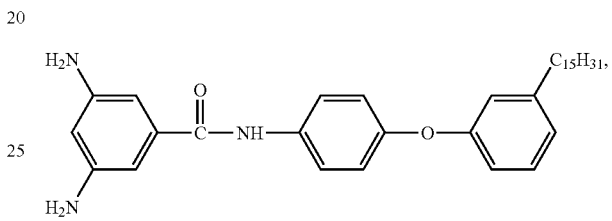

all of which can be prepared as described in Jinu Suju Mathew, "Novel Thermally Stable Polymers from a Renewable Resource (Cashew Nut Shell Liquid): Thesis, Characterization, and Applications," Ph.D. Thesis, U. of Pune, July 2001, chap. 2, the disclosure of which is totally incorporated herein by reference.

Other derivatives can also be used on their own or used as starting materials to make the above derivatives, such as anacardic acid, of the formula

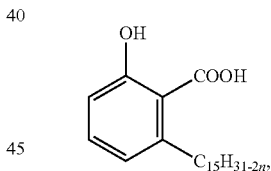

cardol, of the formula

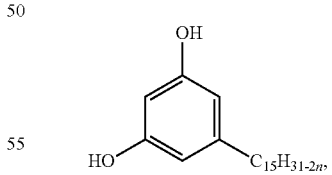

and 2-methyl cardol, of the formula

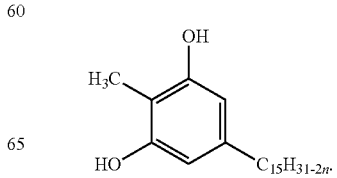

Materials of these formulae can be obtained by extraction from cashew nut shells with solvents or by roasting cashew nut shells at from about 180 to about 200° C. These compounds and their derivatives, as well as cardanol and its derivatives, wherein cardanol is used to refer generically to compounds of the formula

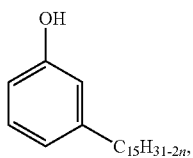

often exhibit desirable antioxidant properties, as disclosed in, for example, Rodrigues et al., *J. Braz. Chem. Soc.*, Vo. 17, No. 2, 265-271, 2006, the disclosure of which is totally incorporated herein by reference.

Other examples of suitable materials include derivatives of the compound

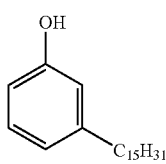

such as

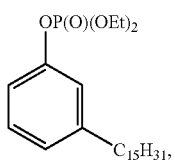

which can be prepared by reacting the parent compound with $(EtO)_2P(O)Cl$,

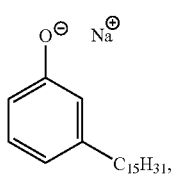

which can be prepared by reacting the parent compound with NaOH,

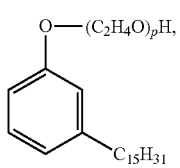

wherein p is an integer of from 1 to about 8, which can be prepared by ethoxylating the parent compound,

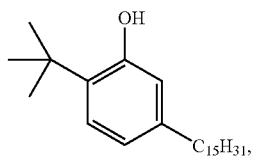

which can be prepared in a number of ways, including by reacting the parent compound with (i) tert-butyl chloride in the presence of $ZnCl_2$, (ii) methyl tert-butyl ether (MTBE) in the presence of $ZnCl_2$, (iii) MTBE in the presence of a cationic acid resin, or (iv) MTBE in the presence of a zeolite catalyst,

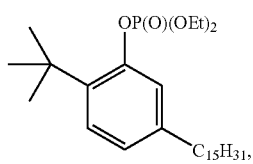

which can be prepared by first forming the tert-butyl derivative and then reacting it with $(EtO)_2P(O)Cl$,

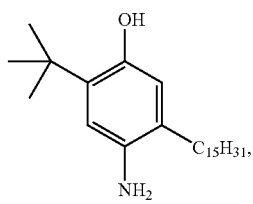

which can be prepared by first forming the tert-butyl derivative and then nitrating it in concentrated sulfuric acid, for example by one of the processes described in Olah, G. A. et al., *Nitration Methods and Mechanisms*, VCH, NY, 1989, the disclosure of which is totally incorporated by reference, followed by reduction of the nitro group to an amine group with hydrogen,

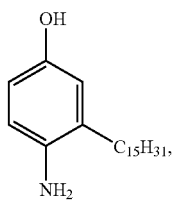

which can be prepared as disclosed in, for example, U.S. Pat. No. 2,502,436, the disclosure of which is totally incorporated by reference,

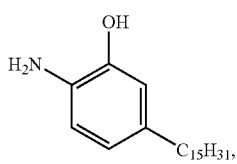

which can be prepared as disclosed in, for example, U.S. Pat. No. 2,502,708, the disclosure of which is totally incorporated by reference, and the like.

Other examples of suitable materials include mono-, di-, and tri-tert-butyl substituted derivatives of the formulae

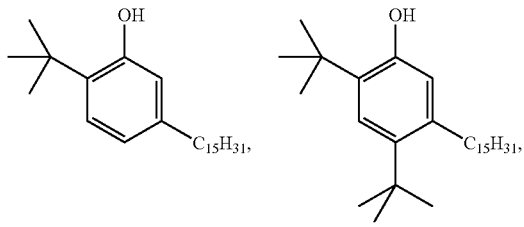

and

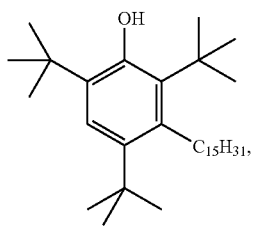

prepared as described in, for example, T. N. Castro Dantas et al., "Novel antioxidants from cashew nut shell liquid applied to gasoline stabilization," *Fuel,* 82 1465-1469 (2003), the disclosure of which is totally incorporated herein by reference. At least some of these compounds can also be used as antioxidants.

Other examples of suitable materials include phosphorothionate derivatives of CNSL compounds, including those of the formula

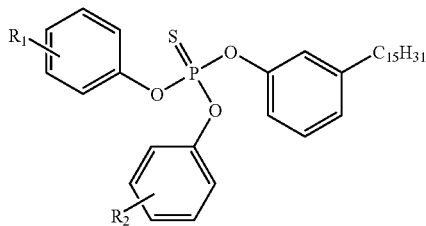

wherein $R_1$ and $R_2$ each, independently of the other, can be hydrogen atoms, alkyl groups (including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 25 carbon atoms, although the number of carbon atoms can be outside of these ranges, aryl groups (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in one embodiment with no more than about 12 carbon atoms, and in specific embodiments 5, 6, 10, or 12 carbon atoms, although the number of carbon atoms can be outside of these ranges, arylalkyl groups (including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as benzyl and the like, or alkylaryl groups (including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, and in one embodiment with no more than about 24 carbon atoms, and in specific embodiments 6, 7, 8, 9, 10, 11, 12, or 13 carbon atoms, although the number of carbon atoms can be outside of these ranges, such as tolyl and the like, wherein the substituents on the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Examples of such materials include

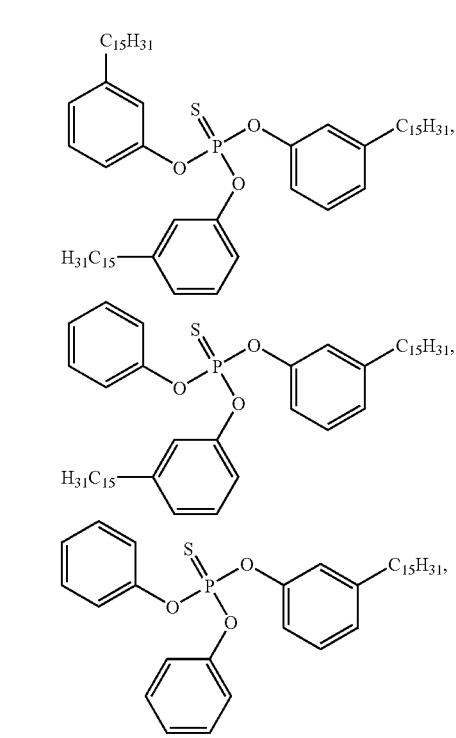

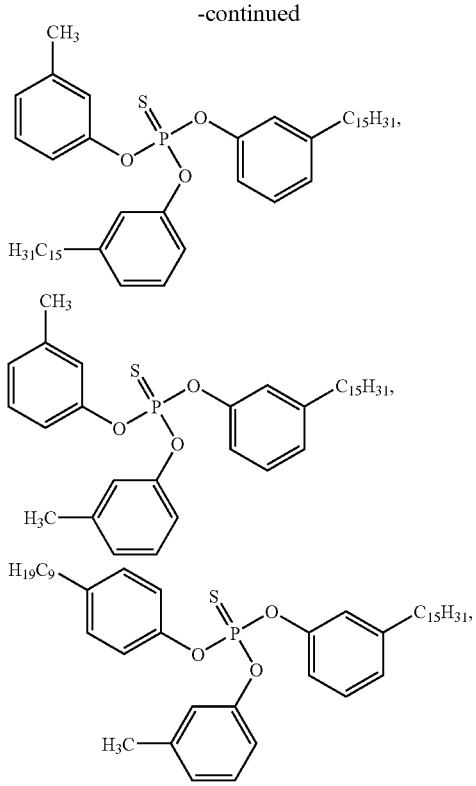

and the like. Compounds of these formulae can be prepared by any desired method, such as those disclosed in U.S. Pat. No. 6,660,696, the disclosure of which is totally incorporated herein by reference.

Suitable compounds can also be prepared as disclosed in, for example, Lubi et al., *Designed Monomers and Polymers*, Vol. 3, No. 2., pp. 123-153 (2000); S. Manjula et al., *J. Appl. Polym. Sci.*, 30, 1767 (1985); Gedam et al., *Prog. Org. Coat.*, 14, 115 (1986); Madhusudhan et al., *Indian J. Tech.*, 11, 347 (1973); Krishnaswamy et al., *Chem. Ind.*, 1892 (1958); Hemalatha et al., *Paint Manuf.*, 39(11), 41 (1969); Basu et al., *Chem. Age India*, 24(6), 341 (1973); Sethi et al., *Indian J. Tech.*, 2, 206 (1964); Bhatnagar, *Pop. Plastics*, 79 (1982); Menon et al., *J. Adhes. Sci. Tech.*, 9, 443-451 (1995); Tyman, *Chem. Soc. Rev.*, 8, 499-537 (1979); Anand, *Chemical and Petro-Chemicals Journal*, 12, 3-11 (1981); Wasserman et al., *J. Am. Chem. Soc.*, 72, 4994 (1950); and Attanasi et al., *Tetrahedron*, 62, 6113-6120 (2006); the disclosures of each of which are totally incorporated herein by reference.

The CNSL-derived additive or mixture of additives is present in the ink in any desired or effective amount, in one embodiment at least about 3 percent by weight of the phase change ink carrier, in another embodiment at least about 20 percent by weight of the phase change ink carrier, and in yet another embodiment at least about 40 percent by weight of the phase change ink carrier, and in one embodiment no more than about 75 percent by weight of the phase change ink carrier, in another embodiment no more than about 40 percent by weight of the phase change ink carrier, and in yet another embodiment no more than about 25 percent by weight of the phase change ink carrier, although the amount can be outside of these ranges.

The CNSL-derived additive or mixture of additives can replace some or all of the semicrystalline and/or amorphous components of the phase change ink carrier as desired. Typical components of a phase change ink carrier will now be described.

Examples of suitable phase change ink carrier materials are monoamides, triamides, tetra-amides, mixtures thereof, and the like. Specific examples of suitable fatty amide ink carrier materials include stearyl stearamide, such as KEMAMIDE S-180, available from Chemtura Corporation, Middlebury, Conn., and the like. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, U.S. Pat. No. 6,663,703, U.S. Pat. No. 6,860,930, and British Patent GB 2 238 792, the disclosures of each of which are totally incorporated herein by reference. In one specific embodiment, a monoamide is present in the ink carrier in an amount in one embodiment of at least about 0.01 percent by weight of the carrier, in another embodiment of at least 2 percent by weight of the carrier, and in yet another embodiment of at least about 5 percent by weight of the carrier, and in one embodiment of no more than about 90 percent by weight of the carrier, in another embodiment of no more than about 85 percent by weight of the carrier, and in yet another embodiment of no more than about 70 percent by weight of the carrier, although the amount can be outside of these ranges. In one specific embodiment, a triamide or tetra-amide is present in the ink carrier in an amount in one embodiment of at least about 5 percent by weight of the carrier, in another embodiment of at least 15 percent by weight of the carrier, and in yet another embodiment of at least about 25 percent by weight of the carrier, and in one embodiment of no more than about 90 percent by weight of the carrier, in another embodiment of no more than about 80 percent by weight of the carrier, and in yet another embodiment of no more than about 70 percent by weight of the carrier, although the amount can be outside of these ranges.

In one specific embodiment, the ink can contain a urethane resin obtained from the reaction of two equivalents of ABITOL® E hydroabietyl alcohol (available from Eastman Chemical Company, Kingsport, Tenn.) and one equivalent of isophorone diisocyanate, prepared as described in Example 1 of U.S. Pat. No. 5,782,966, the disclosure of which is totally incorporated herein by reference. When present, this resin is present in the ink in one embodiment in an amount of at least about 1 percent by weight of the ink carrier, in another embodiment at least about 2 percent by weight of the ink carrier, in yet another embodiment at least about 3 percent by weight of the ink carrier, in another embodiment at least about 4 percent by weight of the ink carrier, and in yet another embodiment at least about 5 percent by weight of the ink carrier, and in one embodiment no more than about 80 percent by weight of the ink carrier, in another embodiment no more than about 70 percent by weight of the ink carrier, and in yet another embodiment no more than about 60 percent by weight of the ink carrier, although the amount can be outside of these ranges.

In another specific embodiment, the ink can contain a urethane resin that is the adduct of three equivalents of stearyl isocyanate and a glycerol-based alcohol prepared as described in Example 4 of U.S. Pat. No. 6,309,453, the disclosure of which is totally incorporated herein by reference. When present, this resin is present in the ink in one embodiment in an amount of at least about 0.5 percent by weight of the ink carrier, in another embodiment at least about 1 percent by weight of the ink carrier, and in yet another embodiment at least about 2 percent by weight of the ink carrier, and in one embodiment no more than about 40 percent by weight of the ink carrier, in another embodiment no more than about 35 percent by weight of the ink carrier, and in yet another embodiment no more than about 30 percent by weight of the ink carrier, although the amount can be outside of these ranges.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material. Specific examples of suitable polyethylene waxes are described in, for example, U.S. Pat. No. 7,407,539, U.S. Pat. No. 7,377,971, and U.S. Pat. No. 7,381,254, the disclosures of each of which are totally incorporated herein by reference.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change ink compositions also contain a colorant. The phase change carrier compositions can be used in combination with phase change ink colorant materials such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Other ink colors besides the subtractive primary colors can be desirable for applications such as postal marking, industrial marking, and labelling using phase change printing, and the inks are applicable to these needs. Further, infrared (IR) or ultraviolet (UV) absorbing dyes can also be incorporated into the inks for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat. No. 5,202,265, U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

The colorant is present in the phase change ink in any desired or effective amount to obtain the desired color or hue, in one embodiment at least about 0.1 percent by weight of the ink, in another embodiment at least about 0.2 percent by weight of the ink, and in yet another embodiment at least about 0.5 percent by weight of the ink, and in one embodiment no more than about 50 percent by weight of the ink, in another embodiment no more than about 20 percent by weight of the ink, and in yet another embodiment no more than about 10 percent by weight of the ink, although the amount can be outside of these ranges.

The inks can also optionally contain an antioxidant. The optional antioxidants of the ink compositions protect the images from oxidation and also protect the ink components from oxidation during the heating portion of the ink preparation process. In some embodiments, antioxidants are not necessary, since some of the CNSL-derived additives can also act as antioxidants. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Eastman Chemical Company, Kingsport, Tenn.), FORAL® 105, a pentaerythritol ester of hydroabietic (rosin) acid (commercially available from Eastman Chemical Company, Kingsport, Tenn.), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd., Osaka, Japan), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these ranges, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

Ink compositions were prepared by the following process. A control ink was prepared by melting together in a 150 mL beaker at a temperature of 120° C. for 2.5 hours (1) 51.37 parts by weight of POLYWAX® 500, obtained from Baker Petrolite, Tulsa, Okla., narrow molecular weight distribution polyethylene wax, distilled to remove about 15 percent of the lower molecular weight fraction and about 15 percent of the upper molecular weight fraction, $M_p=582$, $M_n=562$, $M_w=579$, MWD=1.03 as measured by HT-GPC; (2) 14.75 parts by weight of stearyl stearamide wax (KEMAMIDE® S-180, obtained from Chemtura Corporation, Middlebury, Conn.); (3) 15.34 parts by weight of a branched triamide of the formula

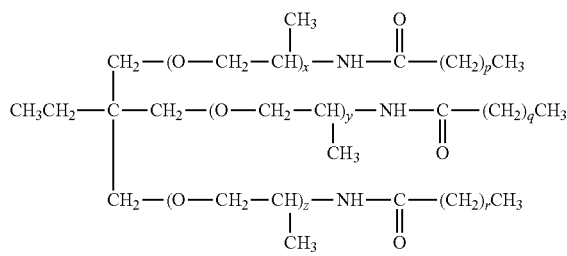

wherein p, q, and r each have an average value of about 35, prepared as described in Example II of U.S. Pat. No. 6,860,930, the disclosure of which is totally incorporated herein by reference; (4) 13.89 parts by weight of KE-100 Resin (triglycerides of hydrogenated abietic (rosin) acid, obtained from Arakawa Chemical Industries (USA) Inc., Chicago, Ill.); (5) 0.93 parts by weight of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference; and (6) 0.17 parts by weight of NAUGUARD® 445 antioxidant (obtained from Uniroyal Chemical Co., Middlebury, Conn.). The resulting mixture was then stirred at 300 rpm for 1.5 hours while maintaining the temperature at 120° C. While mixing, 3.55 parts by weight of a cyan colorant as disclosed in Examples V through XI of U.S. Pat. No. 6,472,523, the disclosure of which is totally incorporated herein by reference, was added slowly and the resulting cyan control ink was further heated while mixing for approximately 5 hours. The ink thus formed was filtered through a heated KST-47 apparatus (obtained from Advantec MFS, Inc.) using a 0.45 micron PALL filter under a pressure of 6 pounds per square inch. The filtered phase change ink was poured in an aluminum mold and allowed to solidify to form an ink stick. The control ink exhibited a viscosity of 10 cps at 120° C., suitable for printing with a piezo printhead such as the one used in the XEROX® PHASER® products.

Ink 1 was prepared by the same process as the control ink except that hydrogenated CARDANOL NC-510, obtained from Cardolite Corporation, Newark, N.J., of the formula

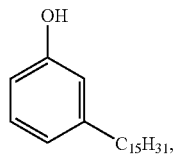

was added prior to stirring at 300 rpm for 1.5 hour at 120° C., the POLYWAX® 500 polyethylene wax was replaced by the harder, lower cost, undistilled POLYWAX® 655 polyethylene wax, and no NAUGAURD® N445 antioxidant was used since it is believed that the CARDANOL NC-510 can act as an antioxidant.

Ink 2 was prepared by the same process as Ink 1 except that NAUGAURD® N445 antioxidant was added as in the control ink and no KEMAMIDE® S-180 stearyl stearamide wax was added.

Ink 3 was prepared by the same process as the control ink except that CARDANOL LITE 2020, of the formula

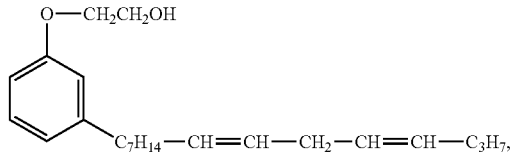

was added prior to stirring at 300 rpm for 1.5 hour at 120° C., the POLYWAX® 500 polyethylene wax was replaced by the harder, lower cost, undistilled POLYWAX® 655 polyethylene wax, and no KE-100 Resin (triglycerides of hydrogenated abietic(rosin)acid) was added.

Ink 4 was prepared by the same process as the control ink except that hydrogenated CARDANOL NC-510 was used to replace KEMAMIDE® S-180 stearyl stearamide wax.

Ink 5 was prepared by the same process as the control ink except that hydrogenated CARDANOL NC-510 was added prior to stirring at 300 rpm for 1.5 hour at 120° C.

Ink 6 can be prepared by the same process as the control ink except that an additional 5 parts by weight of CARDANOL LITE 2020 is added prior to stirring at 300 rpm for 1.5 hour at 120° C.

Ink 7 can be prepared by the same process as the control ink except that an additional 5 parts by weight of hydrogenated CARDANOL NC-510 is added prior to stirring at 300 rpm for 1.5 hour at 120° C.

Exact amounts in terms of percent by weight of the ingredients in the inks are shown in the table below:

| Ingredient | Control | 1 | 2 | 3 | 4 | 5 | 6 | 7 |
|---|---|---|---|---|---|---|---|---|
| P-655 | 0 | 32.73 | 51.37 | 51.37 | 0 | 0 | 0 | 0 |
| distilled P-500 | 51.37 | 0 | 0 | 0 | 51.37 | 32.73 | 48.92 | 48.92 |
| S-180 | 14.75 | 3.83 | 0 | 14.75 | 0 | 3.83 | 14.05 | 14.05 |
| NC-510 | 0 | 24.73 | 14.75 | 0 | 14.75 | 24.56 | 0 | 4.76 |
| 2020 | 0 | 0 | 0 | 14.75 | 0 | 0 | 4.76 | 0 |
| amide resin | 15.34 | 20.34 | 15.34 | 15.34 | 15.34 | 20.34 | 14.61 | 14.61 |
| KE-100 | 13.89 | 13.89 | 13.89 | 0 | 13.89 | 13.89 | 13.23 | 13.23 |
| urethane | 0.93 | 0.93 | 0.93 | 0.93 | 0.93 | 0.93 | 0.89 | 0.89 |
| N-445 | 0.17 | 0 | 0.17 | 0.17 | 0.17 | 0.17 | 0.16 | 0.16 |
| dye | 3.55 | 3.55 | 3.55 | 3.55 | 3.55 | 3.55 | 3.38 | 3.38 |
| Percent green-derived components* | 13.89 | 38.63 | 28.64 | 14.75 | 28.64 | 38.45 | 17.99 | 17.99 |

*Green-derived components are considered to be the KE-100 and the CNSL-derived liquid.

The complex viscosities of the control ink as well as inks 3, 4, and 5 were measured in centipoise at 120° C. on a Rheometrics Fluid Spectrometer RFS3 in a cone-plate geometry (50 millimeters) and a nominal gap of 53 microns and were as follows:
Control Ink: 9.24
Ink 3: 8.80
Ink 4: 8.15
Ink 5: 9.50
Ink 3 and Ink 4 not only contained a higher amount of green-derived components, but, based on their lower viscosities, they can also be jetted at lower temperature compared to the control ink, providing further energy savings.

The rheologies of the control ink and ink 3 were measured on a Rheometrics Fluid Spectrometer RFS3 in a cone-plate geometry (50 millimeters) and a nominal gap of 53 microns and were as indicated in the FIGURE. The graph depicts a plot of complex viscosity versus temperature, and shows a sharp drop in viscosity for the control over the range of about 80 to 90° C. and a sharp drop in viscosity for ink 3 over the range of about 85 to 100° C., the shift being attributed to the use of the higher molecular weight polyethylene wax, POLYWAX 655. It also shows that the addition of CARDANOL LITE 2020 does not significantly affect the viscosity above the melting transition of the inks and the sharpness of the melt transition. This ink can be incorporated into a XEROX® PHASER® 8400 printer modified to print at a jetting temperature of 108° C., a drop mass of 26 nanograms, a voltage of 32.26 volts, a printhead resistivity of 90 nS/cm, a print speed of 10 inches per second, an intermediate transfer drum temperature setpoint of 45° C., a preheater temperature setpoint of 45° C., a jetting frequency of 26 kHz, a transfuse pressure of 570 pounds, and a printing resolution of 563×400 dots per inch. It is believed that good quality images will be obtained on plain paper.

EXAMPLE II

An ink composition was prepared by the method described in Example I containing (1) 48.37 parts by weight of POLYWAX® 500, obtained from Baker Petrolite, Tulsa, Okla., narrow molecular weight distribution polyethylene wax, distilled to remove about 15 percent of the lower molecular weight fraction and about 15 percent of the upper molecular weight fraction; (2) 16.34 parts by weight of a branched triamide of the formula

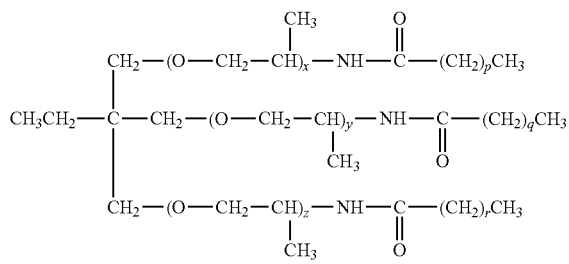

wherein p, q, and r each have an average value of about 35, prepared as described in Example II of U.S. Pat. No. 6,860,930, the disclosure of which is totally incorporated herein by reference; (3) 4.00 parts by weight of stearyl stearamide wax (KEMAMIDE® S-180, obtained from Crompton Corporation, Greenwich, Conn.); (4) 11.89 parts by weight of KE-100 Resin (triglycerides of hydrogenated abietic(rosin)acid, obtained from Arakawa Chemical Industries (USA) Inc., Chicago, Ill.); (5) 0.93 parts by weight of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference; (6) 0.17 parts by weight of NAUGUARD® 445 antioxidant (obtained from Uniroyal Chemical Co., Middlebury, Conn.); (7) 3.55 parts by weight of a cyan colorant as disclosed in Examples V through XI of U.S. Pat. No. 6,472,523, the disclosure of which is totally incorporated herein by reference; and (8) 14.75 parts by weight of hydrogenated CARDANOL NC-510, obtained from Cardolite Corporation, Newark, N.J.; (percent greenderived components 27.57). The ink thus prepared exhibited a viscosity at 120° C. of 8.20 centipoise and at 110° C. of 10.48 centipoise. When incorporated into the XEROX® PHASER® 8400 modified as described in Example I and printed onto HAMMERMILL® paper, good quality prints were obtained. Measured gloss at 60 degree angle was 20.6 GGU. Fold and crease performance, measured by folding creasing a solid print area and then examining this area for missing ink, was apparently perfect. Dither dropout was 3785, dots dropout 2729, optical density 1.27, and colorimetric data as follows:

L*: 58.72
a*: −51.11
b*: −33.37
C*: 61.0
Hue: 213.1

Scratch value appeared to be worse than that of the control ink, as did the coefficient of friction, which correlates to performance in automatic document handlers. These performance measures are believed to be improvable by addition of ink additives known to harden phase change inks.

EXAMPLE III

The processes of Example I are repeated except that CARDANOL, available from Cardolite Corporation, of the formula

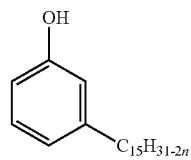

wherein the material contains a mixture of compounds for which n is 0, 1, 2, or 3, is used to replace either the CARDANOL NC-510 or the CARDANOL LITE 2020, respectively. It is believed that similar results will be obtained.

EXAMPLE IV

The processes of Example I are repeated except that a compound of the formula

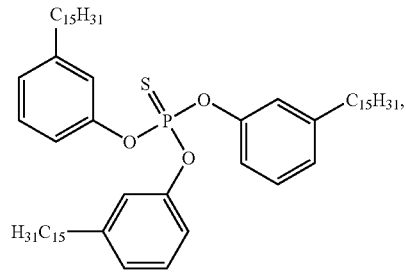

prepared as described in Example 2 of U.S. Pat. No. 6,660,696, the disclosure of which is totally incorporated herein by reference, is used to replace either the CARDANOL NC-510 or the CARDANOL LITE 2020, respectively. It is believed that similar results will be obtained.

EXAMPLE V

The processes of Example I are repeated except that a compound of the formula

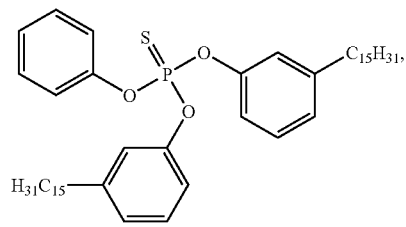

prepared as described in Example 3 of U.S. Pat. No. 6,660,696, the disclosure of which is totally incorporated herein by reference, is used to replace either the CARDANOL NC-510 or the CARDANOL LITE 2020, respectively. It is believed that similar results will be obtained.

EXAMPLE VI

The processes of Example I are repeated except that a compound of the formula

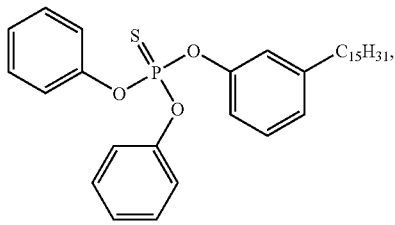

prepared as described in Example 4 of U.S. Pat. No. 6,660, 696, the disclosure of which is totally incorporated herein by reference, is used to replace either the CARDANOL NC-510 or the CARDANOL LITE 2020, respectively. It is believed that similar results will be obtained.

EXAMPLE VII

The processes of Example I are repeated except that a compound of the formula

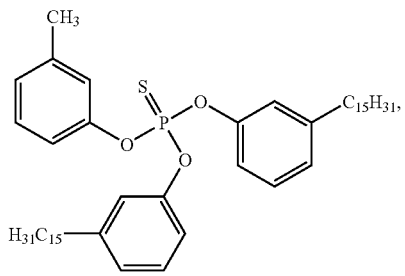

prepared as described in Example 5 of U.S. Pat. No. 6,660, 696, the disclosure of which is totally incorporated herein by reference, is used to replace either the CARDANOL NC-510 or the CARDANOL LITE 2020, respectively. It is believed that similar results will be obtained.

EXAMPLE VIII

The processes of Example I are repeated except that a compound of the formula

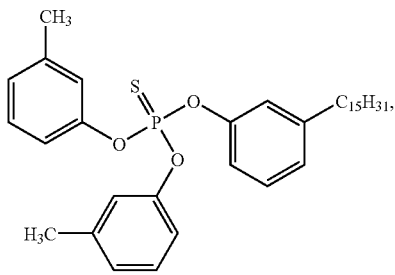

prepared as described in Example 6 of U.S. Pat. No. 6,660, 696, the disclosure of which is totally incorporated herein by reference, is used to replace either the CARDANOL NC-510 or the CARDANOL LITE 2020, respectively. It is believed that similar results will be obtained.

EXAMPLE IX

The processes of Example I are repeated except that a compound of the formula

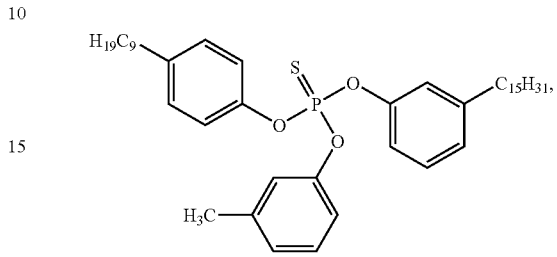

prepared as described in Example 17 of U.S. Pat. No. 6,660, 696, the disclosure of which is totally incorporated herein by reference, is used to replace either the CARDANOL NC-510 or the CARDANOL LITE 2020, respectively. It is believed that similar results will be obtained.

EXAMPLE X 4-(-3-Pentadecylphenoxy)benzene-1,3-diamine is prepared as described in chapter 2 of Jinu Suju Mathew, "Novel Thermally Stable Polymers from a Renewable Resource (Cashew Nut Shell Liquid): Thesis, Characterization, and Applications," Ph.D. Thesis, U. of Pune, July 2001, the disclosure of which is totally incorporated herein by reference. More specifically, to a 100 mL three necked round bottom flask equipped with a reflux condenser, thermowell, and magnetic stirrer is added 5 g (0.016 mol) of 3-pentadecylphenol, 1.35 g (1.3 mL, 0.016 mol) of N-methyl imidazole, and 50 mL methyl ethyl ketone, and the solution is stirred for 1.5 hours. Thereafter 3.33 g (0.016 mol) of 2,4-dinitrochlorobenzene is added to this mixture and the reaction mixture is refluxed for 3 hours. The solvent is then distilled off and the residue dissolved in ether. The ether solution is then washed with water, 5% NaOH solution, and again with water. The ether solution is then dried with sodium sulfate and the ether distilled off to obtain the crude product. The crude product is then recrystallized from petroleum ether at 40 to 60° C. to obtain pure 1-(3-pentadecylphenoxy)-2,4-dinitrobenzene, of the formula

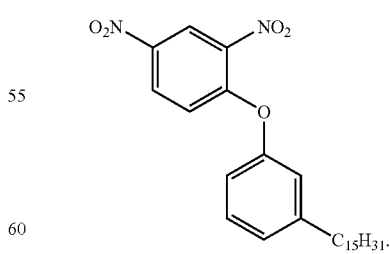

Thereafter, 3 g (0.0063 mol) of the 1-(3-pentadecylphenoxy)-2,4-dinitrobenzene thus prepared is dissolved in 100 mL of methanol in a Parr autoclave and reduced using 0.1 g 5% Pd/C catalyst at 70° C. and 600 psi hydrogen pressure. When the absorption of hydrogen is complete, the solution is filtered to remove the catalyst and the methanol is distilled off. The residue is then dissolved in ether and treated with activated charcoal. After the removal of ether, the residue is recrystallized from petroleum ether at 40 to 60° C. to obtain the pure diamine, of the formula

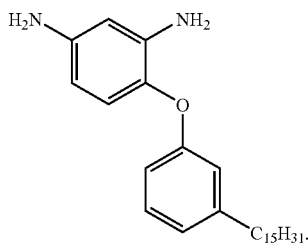

The processes of Example I are then repeated except that a compound of the formula

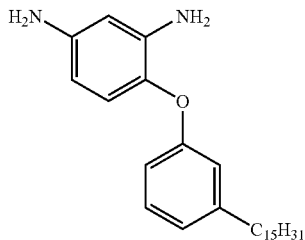

is used to replace either the CARDANOL NC-510 or the CARDANOL LITE 2020, respectively. It is believed that similar results will be obtained.

EXAMPLE XI

3-Pentadecylphenyl-3,5-diaminobenzoate is prepared as described in chapter 2 of Jinu Suju Mathew, "Novel Thermally Stable Polymers from a Renewable Resource (Cashew Nut Shell Liquid): Thesis, Characterization, and Applications," Ph.D. Thesis, U. of Pune, July 2001, the disclosure of which is totally incorporated herein by reference. More specifically, to a single necked round bottom flask equipped with a reflux condenser, guard tube, and magnetic stirrer is added 20 g (0.094 mol) of 3,5-dinitrobenzoic acid and 80 mL of thionyl chloride. The solution is then refluxed with stirring for 6 to 8 hours until the solution becomes clear, and excess thionyl chloride is then distilled out. Thereafter, 50 mL of dry benzene is added to the product and distilled to remove traces of thionyl chloride. After the complete removal of benzene, the 3,5-dinitrobenzoylchloride formed is recrystallized from carbon tetrachloride after charcoal treatment.

To a 500 mL three necked round bottom flask equipped with a magnetic stirrer, reflux condenser, thermowell, nitrogen gas inlet, and guard tube is added 10 g (0.032 mol) of 3-pentadecylphenol, 2.68 g (2.61 mL, 0.032 mol) of N-methyl imidazole, and 150 mL dry tetrahydrofuran under a stream of nitrogen, and the solution is stirred well and cooled to 0° C. Thereafter a solution of 8 g (0.034 mol) of the 3,5-dinitrobenzoyl chloride thus prepared in 30 mL of dry THF is added dropwise to the solution with constant stirring over a period of 1 hour, maintaining the temperature at 0° C. throughout the addition. The reaction mixture is then stirred at room temperature for 5 hours and subsequently at 70° C. for an additional 3 hours. The THF is then distilled off under a stream of nitrogen to obtain a dark yellow residue, which is dissolved in diethyl ether. The ether layer is then washed with a 5% solution of sodium bicarbonate to remove any residual acid. After this, it is thoroughly washed with distilled water to remove the alkali, dried with anhydrous sodium sulfate, followed by distilling off of the ether. The crude product is then recrystallized from ethanol to provide 3-pentadecylphenyl-3,5-dinitrobenzoate, of the formula

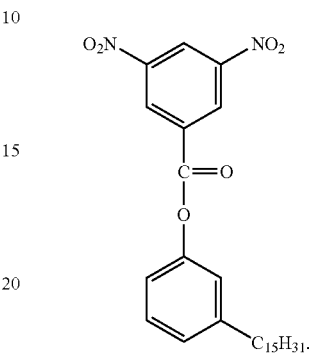

3 g (0.006 mol) of the 3-pentadecylphenyl-3,5-dinitrobenzoate thus prepared is dissolved in 20 mL of ethanol in a Parr autoclave and reduced using 0.1 g 10% Pd/C catalyst at 40° C. and 40 psi hydrogen pressure. When the absorption of hydrogen is complete, the solution is filtered to remove the catalyst and the diamine is recrystallized from the filtrate to yield 3-pentadecylphenyl-3,5-diaminobenzoate, of the formula

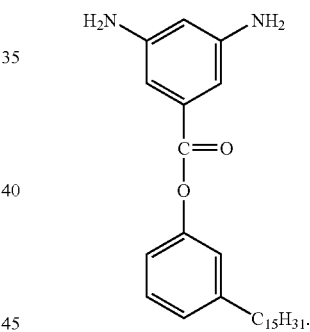

The processes of Example I are then repeated except that a compound of the formula

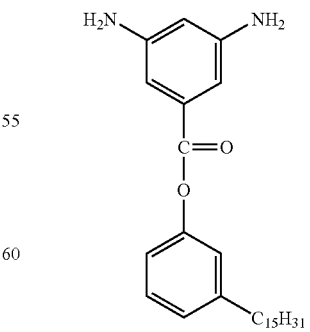

is used to replace either the CARDANOL NC-510 or the CARDANOL LITE 2020, respectively. It is believed that similar results will be obtained.

EXAMPLE XII 3,5-Diamino-N-(4-(3-pentadecylphenoxy)phenyl)benzamide is prepared as described in chapter 2 of Jinu Suju Mathew, "Novel Thermally Stable Polymers from a Renewable Resource (Cashew Nut Shell Liquid): Thesis, Characterization, and Applications," Ph.D. Thesis, U. of Pune, July 2001, the disclosure of which is totally incorporated herein by reference. More specifically, to a 100 mL three necked round bottom flask equipped with a magnetic stirrer, reflux condenser, thermowell, nitrogen inlet, and guard tube is added 3 g (0.0098 mol) of 3-pentadecylphenol, 1.55 g (0.0098 mol) of 1-chloro-4-nitrobenzene, 1.36 g (0.0098 mol) of $K_2CO_3$, and 15 mL of dimethyl formamide at room temperature under a stream of nitrogen. The reaction mixture is then heated to 140° C. and the reaction is continued for 8 hours at this temperature. The reaction mixture is then cooled to room temperature and poured into excess water to precipitate the product. The crude product is filtered and then washed with a large excess of water, dried, and recrystallized from ethanol, yielding 4-nitro-3'-pentadecyldiphenyl ether, of the formula

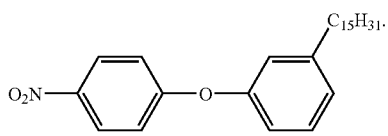

0.3 g (0.007 mol) of the 4-nitro-3'-pentadecyldiphenyl ether thus prepared is then dissolved in 20 mL of ethanol in a Parr autoclave and reduced using 0.1 g 10% Pd/C catalyst at 70° C. and 600 psi hydrogen pressure. When the absorption of hydrogen is complete, the solution is filtered to remove the catalyst and the product is recrystallized from the filtrate to yield 4-amino-3'-pentadecyldiphenyl ether, of the formula

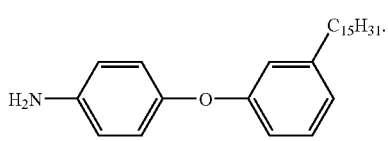

To a 250 mL three necked flask equipped with a magnetic stirrer, reflux condenser, nitrogen gas inlet, and guard tube is then added 3 g (0.0075 mol) of the 4-amino-3'-pentadecyldiphenyl ether thus prepared, 0.61 mL (0.0076 mol) of N-methyl imidazole, and 18 mL of dry dichloroethane, and the reaction mixture is cooled to 0° C. Thereafter, 1.84 g (0.008 mol) of 3,5-dinitrobenzoyl chloride in 5 mL dry dichloroethane is added dropwise over a period of 0.5 hour under a stream of nitrogen, maintaining the temperature at 0° C. After the addition, the reaction mixture is stirred at room temperature for 3 hours, and then at 70° C. for an additional 3 hours. Thereafter, dichloroethane is distilled off and the crude product obtained is washed with saturated sodium bicarbonate solution and then with water, dried, and recrystallized from ethanol to yield 3,5-dinitro-N-(4-(3-pentadecylphenoxy)phenyl)benzamide, of the formula

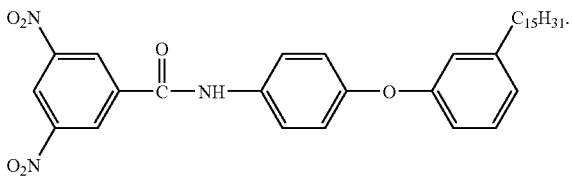

3 g (0.005 mol) of the 3,5-dinitro-N-(4-(3-pentadecylphenoxy)phenyl)benzamide thus prepared is dissolved in 20 mL of ethanol and reduced using 0.1 g 10% Pd/C catalyst at 40° C. and 40 psi hydrogen pressure until no more hydrogen is absorbed. The catalyst is then filtered and the diamine recrystallized from the filtrate to yield 3,5-diamino-N-(4-(3-pentadecylphenoxy)phenyl)benzamide, of the formula

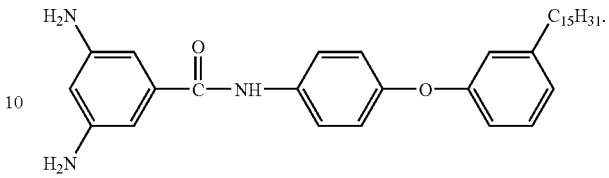

The processes of Example I are then repeated except that a compound of the formula

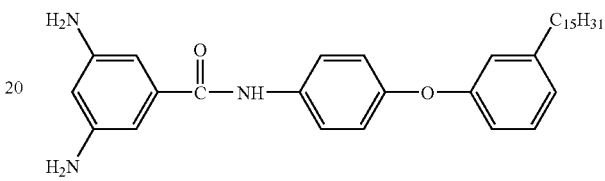

is used to replace either the CARDANOL NC-510 or the CARDANOL LITE 2020, respectively. It is believed that similar results will be obtained.

EXAMPLE XIII

2-Tert-butyl pentadecylphenol is prepared as disclosed in *Fuel*, 82 (2003), the disclosure of which is totally incorporated herein by reference. More specifically, hydrogenated cardanol (0.84 mol) is added to a three-neck round bottom flask containing $AlCl_3$ (0.15 mol) and the system is cooled to a temperature between 0 and 5° C. Tert-butyl chloride (0.25 mol) is then slowly added from a dropping funnel with constant stirring over 4 hours. The formation of the product is monitored by thin layer chromatography (TLC). Thereafter, crushed ice and water are added to the mixture to allow thorough decomposition of intermediate compounds. Separation of two distinct phases is observed, one of the phases turning into a very viscous dark oil. After phase separation, the mixture is distilled under reduced pressure and the product collected and dried with anhydrous $Na2SO_4$. The product is then purified through a silica gel chromatographic column using solutions of $CHCl_3$ and n-hexane of several compositions from 0 to 100% as eluents to yield a compound of the formula

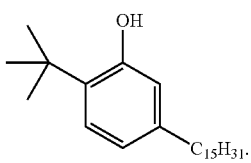

The processes of Example I are then repeated except that a compound of the formula

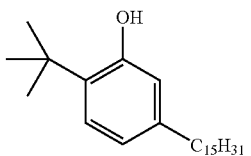

is used to replace either the CARDANOL NC-510 or the CARDANOL LITE 2020, respectively. It is believed that similar results will be obtained.

EXAMPLE XIV 2,4-Di-t-butyl pentadecylphenol is prepared as disclosed in *Fuel*, 82 1465-1469 (2003), the disclosure of which is totally incorporated herein by reference. More specifically, the process described in Example XIII is substantially repeated using as starting materials the product of Example XIII (0.78 mol) and 0.22 mol of t-butyl chloride and allowing the reaction to run for about 6 hours to obtain a product of the formula

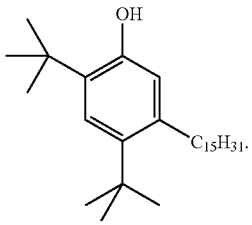

The processes of Example I are then repeated except that a compound of the formula

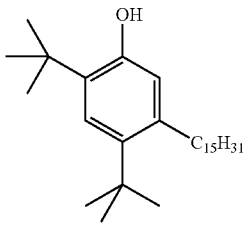

is used to replace either the CARDANOL NC-510 or the CARDANOL LITE 2020, respectively. It is believed that similar results will be obtained.

EXAMPLE XV 2,4,6-Tri-t-butyl pentadecylphenol is prepared as disclosed in *Fuel*, 82 1465-1469 (2003), the disclosure of which is totally incorporated herein by reference. More specifically, the process described in Example XIV is substantially repeated using as starting materials the product of Example XIV (0.88 mol) and 0.19 mol of t-butyl chloride and allowing the reaction to run for about 6 hours and 40 minutes to obtain a product of the formula

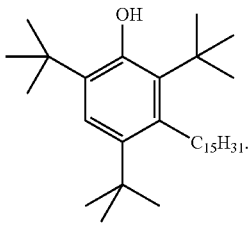

The processes of Example I are then repeated except that a compound of the formula

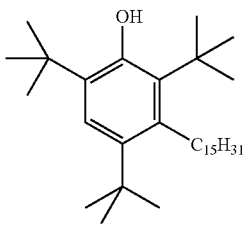

is used to replace either the CARDANOL NC-510 or the CARDANOL LITE 2020, respectively. It is believed that similar results will be obtained.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink comprising
   (1) a colorant and
   (2) an ink carrier comprising an antioxidant, a urethane resin and an additive, wherein the additive is of the formula

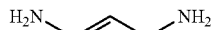
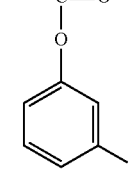
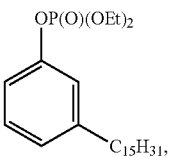
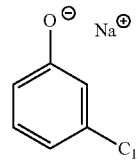
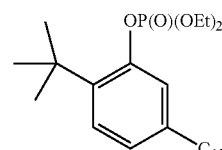

wherein the additive is present in an amount of at least about 3 percent by weight of the ink carrier.

2. An ink according to claim 1 wherein the ink carrier further contains an amide resin.

3. An ink according to claim 2 wherein the amide resin comprises a triamide.

4. An ink according to claim 1 wherein the ink carrier further contains a monoamide.

5. An ink according to claim 4 wherein the monoamide is stearyl stearamide.

6. An ink according to claim 1 wherein the ink carrier comprises a tackifier.

7. An ink according to claim 1 wherein the urethane resin is the adduct of three equivalents of stearyl isocyanate and a glycerol-based alcohol.

8. An ink according to claim 1 wherein the ink carrier further contains a polyethylene wax.

9. A process which comprises
   (1) incorporating into an ink jet printing apparatus the phase change ink of claim 1;
   (2) melting the ink; and
   (3) causing droplets of the melted ink to be ejected in an imagewise pattern onto a substrate.

10. A process according to claim 9 wherein the substrate is a final recording sheet and droplets of the melted ink are ejected in an imagewise pattern directly onto the final recording sheet.

11. A process according to claim 9 wherein the substrate is an intermediate transfer member and droplets of the melted ink are ejected in an imagewise pattern onto the intermediate transfer member followed by transfer of the imagewise pattern from the intermediate transfer member to a final recording sheet.

12. An ink according to claim 1 wherein the additive is present in the ink in an amount of at least about 20 percent by weight of the ink carrier.

13. An ink according to claim 1 wherein the ink has a complex viscosity at about 120° C. of less than about 9.2 centipoise.

14. The ink of claim 1, wherein said additive is present in an amount of no more than about 25 percent by weight of said ink carrier.

15. A process according to claim 9 wherein the ink has a complex viscosity at about 120° C. of less than about 9.2 centipoise.

16. The ink of claim 3, wherein said triamide is branched.

17. The ink of claim 1, wherein said antioxidant is present in an amount of at least about 0.01% by weight of said ink.

18. The ink of claim 1, wherein said additive is present in an amount of at least about 40% by weight of said ink carrier.

19. The ink of claim 1, wherein said additive is present in an amount of no more than about 75% by weight of said ink carrier.

20. The process of claim 9, wherein the printing apparatus comprises a piezoelectric printing process wherein droplets of the ink are ejected in imagewise pattern by oscillation of piezoelectric vibrating elements.

21. The process of claim 11, wherein said intermediate transfer member is heated to a temperature above that of said final recording sheet and below that of said melted ink in said printing apparatus.

\* \* \* \* \*